United States Patent
Zhang et al.

(10) Patent No.: US 9,446,684 B2
(45) Date of Patent: Sep. 20, 2016

(54) SLIP CONTROL DEVICE FOR ELECTRIC VEHICLE

(71) Applicants: Yingjie Zhang, Iwata (JP); Junichi Hirata, Iwata (JP)

(72) Inventors: Yingjie Zhang, Iwata (JP); Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/951,029

(22) Filed: Nov. 24, 2015

(65) Prior Publication Data

US 2016/0075256 A1    Mar. 17, 2016

Related U.S. Application Data

(63) Continuation of application No. PCT/JP2014/063887, filed on May 26, 2014.

(30) Foreign Application Priority Data

Jun. 3, 2013    (JP) .................................. 2013-116726

(51) Int. Cl.
  *B60L 15/00*    (2006.01)
  *B60L 15/20*    (2006.01)
  *B60L 3/10*    (2006.01)
  *B60L 3/12*    (2006.01)

(52) U.S. Cl.
  CPC ............ *B60L 15/2009* (2013.01); *B60L 3/102* (2013.01); *B60L 3/106* (2013.01); *B60L 3/12* (2013.01); *B60L 2220/42* (2013.01); *B60L 2220/44* (2013.01); *B60L 2240/421* (2013.01); *B60L 2240/423* (2013.01); *B60L 2260/44* (2013.01); *B60L 2270/145* (2013.01); *Y02T 10/645* (2013.01); *Y02T 10/648* (2013.01); *Y02T 10/7275* (2013.01)

(58) Field of Classification Search
  CPC ........... B60T 2210/16; B60T 2230/02; B60T 2240/08; B60T 2270/208; B60T 2270/211; B60T 2270/86; B60T 8/1755; B60T 8/17552; B60T 8/1769; B60T 8/4266; B60W 10/08; B60W 2520/26; B60W 2550/148
  See application file for complete search history.

(56) References Cited

U.S. PATENT DOCUMENTS

| 4,860,847 A | 8/1989 | Shiraishi et al. |
|---|---|---|
| 5,018,595 A | 5/1991 | Hara et al. |

(Continued)

FOREIGN PATENT DOCUMENTS

| AU | 760385 | 1/2002 | |
|---|---|---|---|
| DE | GB 2243657 A | * 11/1991 | ............. B60T 8/172 |

(Continued)

OTHER PUBLICATIONS

International Search Report mailed Aug. 12, 2014, in corresponding International Application No. PCT/JP2014/063887.
U.S. Appl. No. 14/950,872, filed Nov. 24, 2015, Yingjie Zhang et al., NTN Corporation, Osaka, Japan.

(Continued)

*Primary Examiner* — Jelani Smith

(57) ABSTRACT

A slip control device for an electric automobile includes a maximum rotation frequency calculator to calculate a drive wheel maximum rotation frequency Nmax on the basis of a rotation frequency N1 of a driven wheel and an ideal slip ratio λmin according to the formula (Nmax−N1)/N1=λmin. It is determined whether a drive wheel rotation frequency N2 exceeds the frequency Nmax. If it is determined that the frequency N2 exceeds the frequency Nmax, a torque command value to a motor unit is made to be zero.

8 Claims, 4 Drawing Sheets

(56) References Cited

U.S. PATENT DOCUMENTS

| | | | |
|---|---|---|---|
| 7,792,625 B2* | 9/2010 | Hrovat | B60K 28/16 |
| | | | 701/82 |
| 8,768,550 B2 | 7/2014 | Saitio | |
| 8,886,381 B2 | 11/2014 | Ozaki | |
| 9,114,711 B2 | 8/2015 | Ozaki | |
| 2010/0025131 A1* | 2/2010 | Gloceri | B60G 3/20 |
| | | | 180/65.28 |
| 2012/0191281 A1 | 7/2012 | Saito | |
| 2013/0345917 A1 | 12/2013 | Ozaki | |
| 2014/0330470 A1 | 11/2014 | Ozaki et al. | |
| 2015/0142240 A1 | 5/2015 | Ozaki | |
| 2015/0266487 A1* | 9/2015 | Kato | B60L 15/38 |
| | | | 701/22 |

FOREIGN PATENT DOCUMENTS

| | | |
|---|---|---|
| JP | 63-1743 | 1/1988 |
| JP | 63-259141 | 10/1988 |
| JP | 3-130544 | 6/1991 |
| JP | 2002-27610 | 1/2002 |
| JP | 2009-126329 | 6/2009 |
| JP | 2012-157178 | 8/2012 |
| JP | 2012-186928 | 9/2012 |
| JP | 2013-42599 | 2/2013 |
| WO | WO 2013/077409 A1 | 5/2013 |

OTHER PUBLICATIONS

PCT International Preliminary Report on Patentability dated Dec. 17, 2015 in corresponding International Patent Application No. PCT/JP2011/063887.

* cited by examiner

SLIP CONTROL DEVICE FOR ELECTRIC VEHICLE

CROSS REFERENCE TO THE RELATED APPLICATION

This application is a continuation application, under 35 U.S.C. §111(a), of international application No. PCT/JP2014/063887, filed May 26, 2014, which claims Convention priority to Japanese patent application No. 2013-116726, filed Jun. 3, 2013. The entire disclosure of the above application(s) are herein incorporated by reference as a part of this application.

BACKGROUND OF THE INVENTION

1. Field of the Invention

The present invention relates to a slip control device which is provided in an electric automobile such as a vehicle running by drive of only a motor or a vehicle including both a motor and an internal combustion engine, and which performs torque limitation when a slippage occurs during running with the motor, to eliminate the slippage.

2. Description of Related Art

In order to prevent acceleration from being stopped due to a slippage of a drive wheel caused by an excessive driving torque during acceleration of a vehicle, a traction control device for the vehicle is generally known to detect the slip amount of the drive wheel and limits engine output or a wheel braking force such that the slip amount of the drive wheel reaches a target slip amount for the frictional coefficient of a road surface (e.g., Patent Document 1). In particular, the traction control device controls the slip amount by decreasing the engine output or increasing the braking force.

The following technique has been proposed for an electric automobile which performs slip control (Patent Document 2). In this proposal, a slip ratio λ is obtained on the basis of rotation frequencies N1 and N2 of respective driven and drive wheels. Then, a generated torque estimation value Te due to an external force applied to the vehicle, such as the force exerted by the vehicle body weight, is obtained by a disturbance observer. An entire action torque T acting on the drive wheel is obtained on the basis of the generated torque estimation value Te and a motor torque Tm, and a coefficient of friction μ between a road surface and a tire is estimated on the basis of the torque and the slip ratio λ. A permissible maximum torque Tmax is obtained on the basis of the coefficient of friction μ and a vertical load FZ, and torque limitation is performed such that the torque does not exceed the permissible maximum torque Tmax.

RELATED DOCUMENT

Patent Document

[Patent Document 1] JP Laid-open Patent Publication No. S63-259141
[Patent Document 2] JP Laid-open Patent Publication No. 2012-186928

SUMMARY OF THE INVENTION

Patent Document 1 discloses a technique applied to an automobile with an internal combustion engine, and the responsiveness of the engine and a brake is poor, so that rapid control is impossible. If a driving force control device configured on the assumption of a conventional internal combustion engine is applied to a vehicle driven by a motor unit, since the motor unit has very high responsiveness as compared to the internal combustion machine, an uncomfortable feeling would be provided to a driver due to excessive response of the motor unit.

The slip control in Patent Document 2 itself is excellent, but a system is redundant due to calculation of the disturbance observer. In addition, a load sensor is required for the drive wheel. Due to them, the cost is increased.

An object of the present invention is to provide a slip control device for an electric automobile which slip control device is able to assuredly eliminate a slippage during running with a motor unit, with a simple configuration without involving a wasted decrease in running performance.

Hereinafter, for convenience of easy understanding of the present invention, a description will be given with reference to the reference numerals in embodiments.

A slip control device 20 according to one aspect of the present invention is provided in an electric automobile including at least one electric motor unit 3 configured to rotationally drive a drive wheel 7, for slip-controlling the electric automobile, the device including:

a driven wheel rotation frequency observation module 21 configured to observe a rotation frequency of a driven wheel 6;

a maximum rotation frequency calculation module 22 configured to calculate a current drive wheel maximum rotation frequency Nmax on the basis of an observed current rotation frequency N1 of the driven wheel 6 and a set ideal slip ratio λmin according to the following formula, $$(Nmax-N1)/N1=\lambda min;$$

a drive wheel rotation frequency observation module 23 configured to observe a drive wheel rotation frequency N2 which is a rotation frequency of the drive wheel 7;

a slip condition determination module 24 configured to determine whether the observed drive wheel rotation frequency N2 exceeds the drive wheel maximum rotation frequency Nmax; and a torque cancellation module 26 configured to make a torque command value to the motor unit 3 that drives the drive wheel 7 to be zero, if the slip condition determination module 24 determines that the drive wheel rotation frequency N2 exceeds the drive wheel maximum rotation frequency Nmax.

The "rotation frequency" in the present specification refers to the number of rotations per unit time and is synonymous with a rotation speed.

Regarding a slip ratio λ of a tire of the drive wheel 7 with respect to a road surface, a value at which a grip ratio is maximum is present at about 0.15 even with any of a dry road surface, a wet road surface, and a frozen road surface. Therefore, when the ideal slip ratio λmin is set around 0.15 as appropriate, the drive wheel maximum rotation frequency Nmax can be determined on the basis of the driven wheel rotation frequency N1 according to the following formula, (Nmax−N1)/N1=λmin.

The slip condition determination module 24 determines whether the drive wheel rotation frequency N2 exceeds the thus-calculated drive wheel maximum rotation frequency Nmax. If the drive wheel rotation frequency N2 exceeds the drive wheel maximum rotation frequency Nmax, the slip ratio is determined to be higher than the ideal slip ratio λmin. If the slip ratio is determined so, the torque cancellation module 26 makes the torque command value to the motor unit 3 that drives the drive wheel 7, to be zero. The torque cancellation module 26 makes the torque command value to be zero at the time of a slippage. By making the torque for the drive wheel 7 to be zero, the slippage can be assuredly eliminated.

As described above, the drive wheel maximum rotation frequency Nmax is determined on the basis of the driven wheel rotation frequency N1, and the drive wheel maximum rotation frequency Nmax and the current drive wheel rotation frequency N2 are compared to each other to determine whether the slip ratio is higher than the ideal slip ratio λmin. Thus, the occurrence of a slippage can be determined with a simple configuration and calculation as compared to the case where a disturbance observer is provided, and the accuracy of the slip determination is also ensured at a required level. In addition, as a detection device, only a rotation frequency detection device 15 and 14 for the driven wheel 6 and the drive wheel 7 are sufficient, and another sensor such as a load sensor is not required, so that the cost can be also reduced in this respect.

As described above, a slippage can be assuredly eliminated with a simple configuration without involving a wasted decrease in running speed.

The slip control device may further include:
 a slip watch condition determination module 25 configured to determine whether the drive wheel rotation frequency N2 exceeds a watch condition rotation frequency Nc which is set to a value lower than the drive wheel maximum rotation frequency Nmax, if the slip condition determination module 24 determines that the drive wheel rotation frequency N2 does not exceed the drive wheel maximum rotation frequency Nmax; and
 a torque reduction module 27 configured to decrease the torque command value to the motor unit 3 that drives the drive wheel 7, if the slip watch condition determination module 25 determines that the drive wheel rotation frequency N2 exceeds the watch condition rotation frequency Nc. The torque reduction module 27 decreases the torque command value in a watch condition.

As described above, even when no slippage has occurred, if a watch condition where a slippage is likely to occur is assumed, the torque of the motor unit is reduced to some extent beforehand, whereby shock and/or vibration of a vehicle body when the torque is made to be zero due to occurrence of a slippage is reduced, so that an uncomfortable feeling to be provided to a driver can be alleviated.

The torque reduction module 27 may calculate a difference between the drive wheel rotation frequency N2 and the drive wheel maximum rotation frequency Nmax, and may decrease the torque command value as the difference decreases.

For example, according to a nonlinear curve A which defines a relationship between the difference and a ratio of the torque command value to the motor unit relative to a torque command value from an accelerator, the torque reduction module 27 may decrease the torque command value as the difference decreases.

When the rotation frequency of the drive wheel 7 gets closer and closer to the drive wheel maximum rotation frequency Nmax, there is a high possibility that a slippage occurs. Thus, if the rotation frequency of the drive wheel 7 gets close to the drive wheel maximum rotation frequency Nmax, the torque is greatly reduced so as to quickly return to a safe condition. By so doing, even if the drive wheel maximum rotation frequency Nmax is exceeded and the torque cancellation module 26 makes the torque to be zero, since the torque has been greatly reduced in a watch condition, rapid torque change is not caused, and little vibration occurs in the vehicle body.

An electric automobile according to one aspect of the present invention includes the slip control device 20 and the at least one electric motor unit including a plurality of the motor units 3. The slip condition determination module 25 and the torque cancellation module 27 are provided for each of the motor units 3.

In a preferred embodiment, the drive wheel includes a pair of left and right drive wheels 7, and the driven wheel includes a pair of left and right driven wheels 6. The driven wheel rotation frequency observation module 21 may use an average of detection values of rotation frequencies of the pair of driven wheels, as the observed rotation frequency. Alternatively, the driven wheel rotation frequency observation module 21 may use a detection value of a rotation frequency of the driven wheel 6, of the pair of driven wheels 6, located at the same side as one drive wheel 7, of the pair of drive wheels 7, at which the slip condition determination module 24 determines whether a slip condition has occurred set, as the observed rotation frequency.

Each motor unit 3 may form an in-wheel motor device 11.

In the in-wheel motor device 11, each drive wheel 7 is individually driven by the motor unit, and thus is greatly affected by a slippage. Therefore, the effect by the slip control is more effectively exerted.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
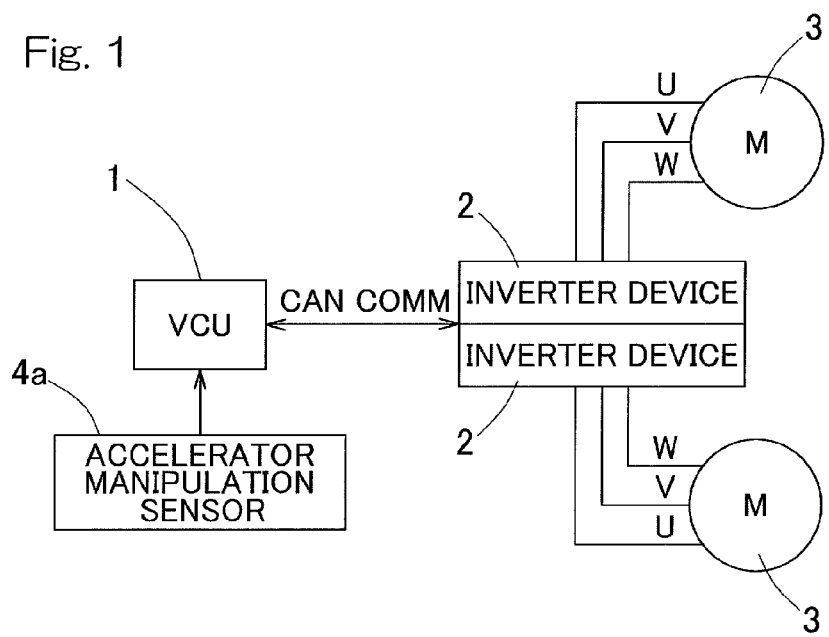
FIG. 1 is a block diagram of a schematic configuration of an electric automobile drive system including slip control devices, for an electric automobile, according to an embodiment of the present invention.

An embodiment of the present invention will be described with reference to the drawings. FIG. 1 shows an electric automobile drive system including slip control devices according to the embodiment. The electric automobile drive system includes a VCU (vehicle control unit) 1 and inverter devices 2. The VCU 1 is a computer type electric control unit which performs integrated control and cooperative control of the entire vehicle, and is also referred to as "ECU". The inverter devices 2 are configured to apply driving currents to a plurality of traction motor units 3, respectively, in accordance with a drive command sent from the VCU 1. The VCU 1 and the inverter devices 2 are connected to each other so as to enable signal transmission therebetween via communication line such as CAN (control area network) communication. FIG. 1 shows an example of application to a vehicle including left and right two wheels which are driven by the motor units 3, respectively. In this example, each motor unit 3 is composed of an induction motor unit or a synchronous motor unit driven by three-phase alternating current. A torque command which indicates an accelerator manipulation amount and is outputted from an accelerator manipulation sensor 4a is inputted to the VCU 1, and distributed from the VCU 1 to the inverter devices 2 for the respective motor units 3.

Figure 2:
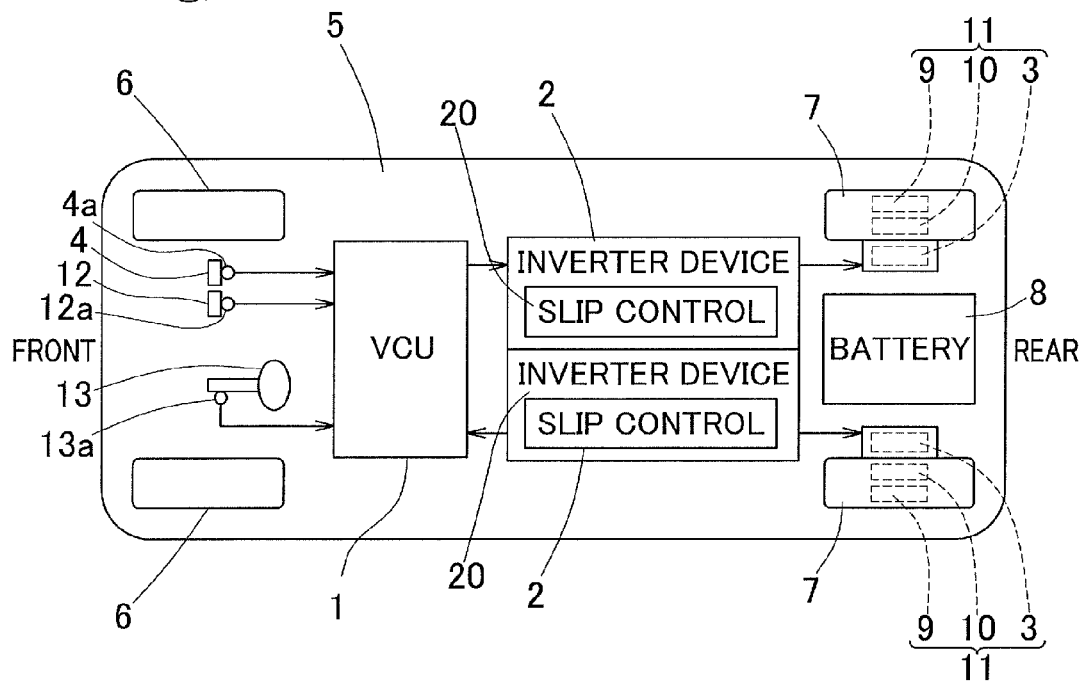
FIG. 2 is a block diagram showing an example of the electric automobile drive system shown in FIG. 1.

FIG. 2 shows an example of the electric automobile drive system. The electric automobile 5 includes a vehicle body and four wheels composed of front wheels 6 and rear wheels 7, which function as driven wheels 6 and drive wheels 7, respectively. In this example, each motor unit 3, together with a wheel bearing 9 and a reducer 10, forms an in-wheel motor drive device 11. The reducer 10 reduces the speed of rotation output of the motor unit 3 and transmits the rotation output to a rotating ring (not shown) of the wheel bearing 9.

The VCU 1 receives signal indicating an accelerator manipulation amount, a signal indicating a brake manipulation amount, and a signal indicating a steering wheel manipulation amount, from the accelerator manipulation sensor 4a for an accelerator 4, a brake manipulation sensor 12a for a brake 12, and a steering sensor 13a for a steering wheel 13, respectively. In accordance with the signal indicating the accelerator manipulation amount from the accelerator manipulation sensor 4a, the VCU 1 generates torque command values to be distributed to the respective left and right motor units 3, in consideration of the signal indicating the brake manipulation amount and the signal indicating the steering wheel manipulation amount, and sends the torque command values to the respective inverter devices 2. Each inverter device 2 converts a DC power from a battery 8 into an AC motor driving current to control the motor driving current in accordance with the torque command.

The inverter devices 2 include slip control devices 20, for the electric automobile, according to the embodiment, respectively. Alternatively, the slip control devices 20 may be provided in the VCU 1.

Figure 3:
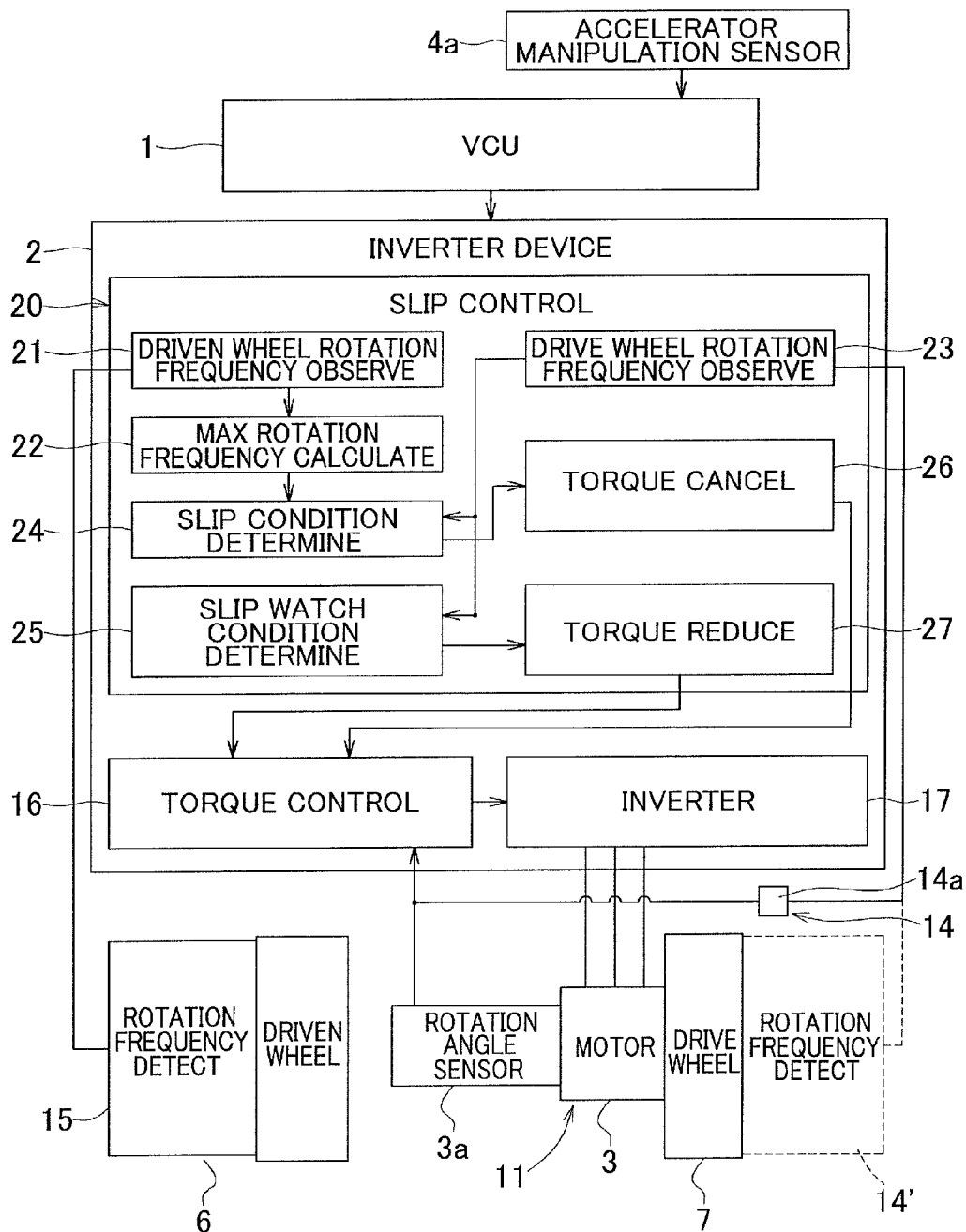
FIG. 3 is a block diagram of a schematic configuration of the slip control device of the electric automobile drive system shown in FIG. 1.

FIG. 3 is a functional block diagram showing the configuration of the inverter device 2, in particular, the configuration of the slip control device 20. The inverter device 2 includes: an inverter 17 which converts a DC power from a battery (not shown) into a three-phase AC power; and a torque control module 16 which converts the torque command sent from the VCU 1, into a current command and controls current output of the inverter 17. The torque control module 16 may perform control such as vector control which achieves efficiency improvement in accordance with a rotation angle of a rotor (not shown) of the motor unit 3. For this control, a rotation angle detection value from a rotation angle sensor 3a provided to the motor unit 3 is inputted to the torque control module 16.

The inverter device 2 is provided with a rotation frequency conversion module 14a. The rotation frequency conversion module 14a differentiates the rotation angle detection value from the rotation angle sensor 3a and divides the differentiated value by a speed reduction rate of the reducer 10 (FIG. 2), to calculate a rotation frequency of the drive wheel 7. The rotation frequency conversion module 14a and the rotation angle sensor 3a form a rotation frequency detection device 14. In addition to the rotation angle sensor 3a, a rotation frequency detection device 14' configured to detect a rotation speed of the drive wheel 7 may be provided, for example, on the wheel bearing 9 (FIG. 2). As shown in FIG. 3, to the driven wheel 6, a rotation frequency detection device 15 that detects a rotation frequency of the driven wheel 6 is provided, for example, on a wheel bearing (not shown) of the driven wheel 6.

The torque control module 16 is formed on a light current circuit segment including an electronic circuit of the inverter device 2 such as a microcomputer. The slip control device 20 is also formed on the light current circuit segment. Since the slip control devices 20 are provided for the drive wheels 7, respectively, control by the slip control devices 20 is performed individually for the left and right drive wheels 7.

Figure 4:
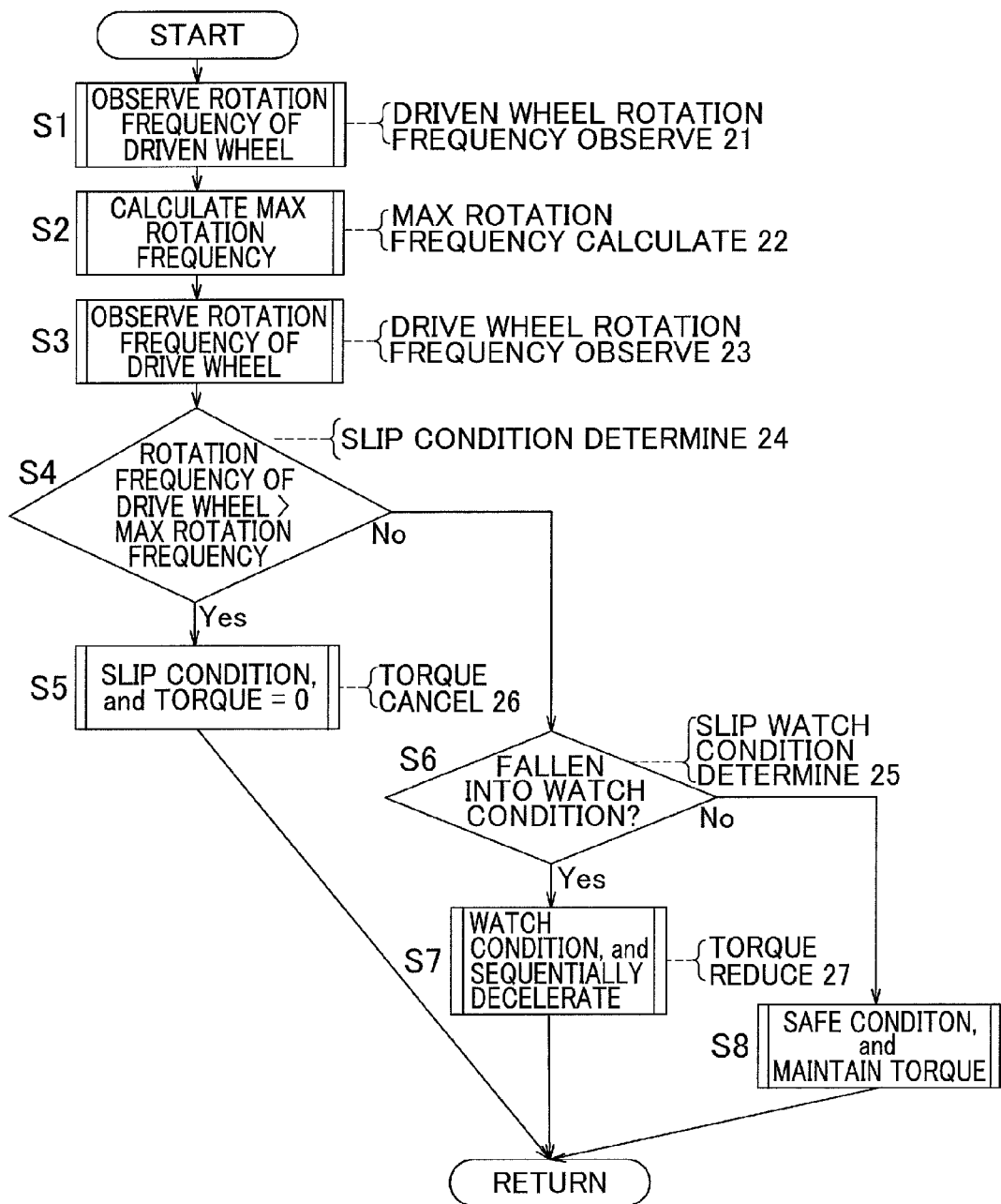
FIG. 4 is a flowchart showing a control operation of the slip control device shown in FIG. 3.
Figure 5:
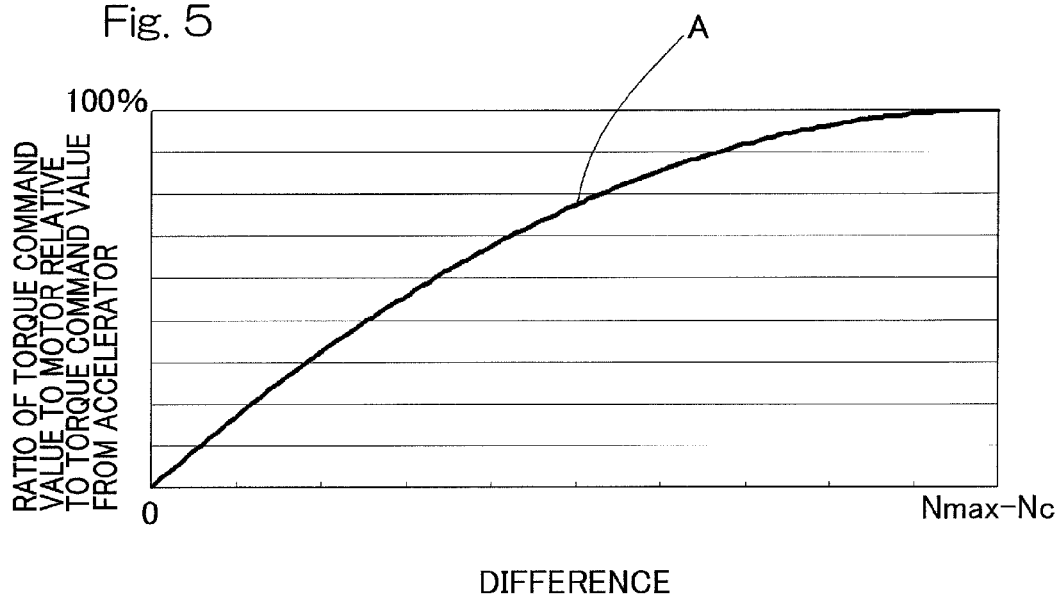
FIG. 5 is a graph showing a relationship between a difference and a torque in the slip control device shown in FIG. 3.

The slip control device 20 is configured to perform control shown in a flowchart of FIG. 4. As shown in FIG. 3, the slip control device 20 includes a driven wheel rotation frequency observation module 21, a maximum rotation frequency calculation module 22, a drive wheel rotation frequency observation module 23, a slip condition determination module 24, a torque cancellation module 26, a slip watch condition determination module 25, and a torque reduction module 27. The respective module 21 to 27 will be described in detail with reference to the flowchart of FIG. 4.

First, the rotation frequency of the driven wheel 6 obtained from the rotation frequency detection device 15 is continuously monitored, that is, observed (step S1). The observed rotation frequency of the driven wheel 6, may be the average of detection values of the rotation frequencies of the driven wheels 6 at both left and right sides, or may be the rotation frequency of the driven wheel 6 at the laterally same side as the drive wheel 7 for which slip control is performed. The process in step S1 is performed by the driven wheel rotation frequency observation module 21.

A current drive wheel maximum rotation frequency Nmax is calculated on the basis of the thus-obtained current rotation frequency N1 of the driven wheel 6 and a preset ideal slip ratio λmin according to the following formula (1) (S2).

$$(N\text{max}-N1)/N1=\lambda\text{min} \quad (1)$$

The ideal slip ratio λmin is, for example, a value determined optionally in a range of 0.14 to 0.16. In this example, λmin=0.15.

Figure 6:
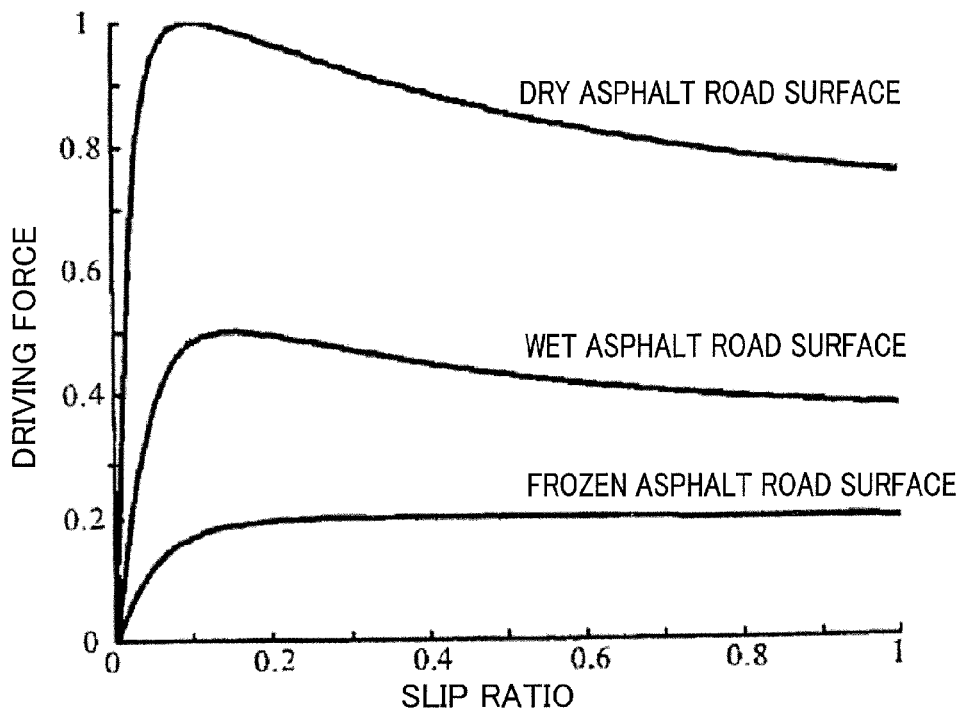
FIG. 6 is a graph showing a relationship between a slip ratio and a driving force in various conditions of a road surface.

Regarding a slip ratio λ of a tire of the drive wheel 7 with respect to a road surface, as shown in an example in FIG. 6, a value at which a grip ratio is maximum is present at 0.15 even with any of a dry road surface, a wet road surface, and a frozen road surface. Therefore, the ideal slip ratio λmin is set around 0.15 as appropriate, and the drive wheel maximum rotation frequency Nmax can be determined on the basis of the driven wheel rotation frequency N1 according to the above formula (1).

The process in the step (S2) of calculating the drive wheel maximum rotation frequency Nmax is performed by the maximum rotation frequency calculation module 22.

After, during, or before the calculation of the drive wheel maximum rotation frequency Nmax, a drive wheel rotation frequency N2 which is the rotation frequency of the drive wheel 7 is observed and obtained (S3). The drive wheel rotation frequency N2 may be obtained from the rotation frequency detection device 14 composed of the rotation angle sensor 3*a* and the rotation frequency conversion module 14*a* as described, or may be obtained from the rotation frequency detection device 14' that directly detects a rotation frequency of the drive wheel 7.

The process in the step (S3) of observing the drive wheel rotation frequency N2 as described is performed by the drive wheel rotation frequency observation module 23.

Next, the observed drive wheel rotation frequency N2 is compared to the drive wheel maximum rotation frequency Nmax to determine whether the observed drive wheel rotation frequency N2 exceeds the drive wheel maximum rotation frequency Nmax (S4). The process in the determination step (S4) is performed by the slip condition determination module 24.

If the slip condition determination module 24 determines that the drive wheel rotation frequency N2 exceeds the drive wheel maximum rotation frequency Nmax, the slip ratio is estimated to be higher than the ideal slip ratio. Then, if the slip ratio is estimated so, a torque command value to be applied to the motor unit 3 that drives the drive wheel 7 is made to be zero (S5). Specifically, a torque command value to be sent to the torque control module 16 is made to be zero, or a current command to be outputted from the torque control module 16 is made to be zero.

The process (S5) of making the torque command value to be zero is performed by the torque cancellation module 26.

As described above, if the slip ratio is estimated to be higher than the ideal slip ratio, the torque command value for the motor unit 3 is made to be zero, so that the slippage can be assuredly eliminated. In addition, as described above, the drive wheel maximum rotation frequency Nmax is determined on the basis of the driven wheel rotation frequency N1, and is compared to the current drive wheel rotation frequency N2 to determine whether the slip ratio is higher than the ideal slip ratio. Thus, the occurrence of a slippage can be determined with a simple configuration and calculation as compared to the case where a disturbance observer is provided, and the accuracy of the slip determination is also ensured at a required level. In addition, as the detection device, only the rotation frequency detection device 15 and 14 (14') for the driven wheels 6 and the drive wheels 7 are sufficient, and a load sensor or the like is not required, so that the cost can be also reduced in this respect.

As described above, the slippage can be assuredly eliminated with a simple configuration without involving a wasted decrease in running performance.

If it is determined that the drive wheel rotation frequency N2 does not exceed the drive wheel maximum rotation frequency Nmax in the step (S4) of comparison between the drive wheel rotation frequency N2 and the drive wheel maximum rotation frequency Nmax, it may be determined whether the drive wheel rotation frequency N2 is in a watch condition, that is, exceeds a watch condition rotation frequency Nc which is set to a value lower than the drive wheel maximum rotation frequency Nmax. In other words, it may be determined whether the drive wheel rotation frequency N2 is close to the drive wheel maximum rotation frequency Nmax to some extent. The watch condition rotation frequency Nc is set, for example, to a rotation frequency which is lower than the drive wheel maximum rotation frequency Nmax by 10% of the driven wheel rotation frequency N1.

That is, the watch condition rotation frequency Nc is set as follows:

watch condition rotation frequency Nc=drive wheel maximum rotation frequency Nmax−(driven wheel rotation frequency×10%).

The determination process in this step (S5) is performed by the slip watch condition determination module 25.

If it is determined that the drive wheel rotation frequency N2 does not indicate a watch condition, the current condition is determined to be safe where there is almost no possibility of a slippage, a torque change process is not performed (S8), a return is made to start, and the routine in FIG. 4 is repeated from the initial step S1 again.

If it is determined that the drive wheel rotation frequency N2 is in a watch condition, that is, if it is determined that the drive wheel rotation frequency N2 exceeds the watch condition rotation frequency Nc, the torque command value for the motor unit 3 that drives the drive wheel 7 is decreased. Specifically, a torque command value to be sent to the torque control module 16 is decreased, or a current command to be outputted from the torque control module 16 is decreased (S7).

In this step (S7), more specifically, the difference between the drive wheel rotation frequency N2 and the drive wheel maximum rotation frequency Nmax is calculated, and a torque command value depending on the difference is outputted. Specifically, the torque command value is decreased as the difference decreases. For example, the torque command value is set according to a nonlinear curve A which defines a relationship between the difference and a ratio of a torque command value to the motor unit relative to a torque command from the accelerator as shown in FIG. 4. In the relationship defined by the curve A, the lower the difference is, the lower the ratio is.

The curve A is set such that when the difference is zero, the ratio is zero; as the difference increases, the torque ratio increases and the degree of the increase is decreased; and when the difference deviates from the watch condition (the difference becomes greater than Nmax−Nc), the torque ratio becomes 100%. In addition, the curve A is a continuous line (differentiable at any point) from the point at which the difference is zero and the torque ratio is zero to the point at which the torque is 100%.

The process in this step (S7) is performed by the torque reduction module 27.

As described above, even when no slippage has occurred, if a watch condition where a slippage is likely to occur is assumed, the torque of the motor unit 3 is reduced to some extent beforehand, whereby shock and/or vibration of the vehicle body when the torque is made to be zero due to occurrence of a slippage is reduced, so that an uncomfortable feeling to be provided to the driver can be alleviated.

When the rotation frequency of the drive wheel 7 gets closer and closer to the drive wheel maximum rotation frequency Nmax, there is a high possibility that a slippage occurs. Thus, if the rotation frequency of the drive wheel 7 gets close to the drive wheel maximum rotation frequency Nmax, the torque is greatly reduced as shown by the curve A so as to quickly return to a safe condition. By so doing, even if the drive wheel maximum rotation frequency Nmax is exceeded and the torque cancellation module 26 makes the torque to be zero, since the torque has been greatly reduced in a watch condition, rapid torque change is not caused, and little vibration occurs in the vehicle body.

The slip control devices according to the embodiment are provided to the vehicle including the in-wheel motor devices 11. In the in-wheel motor device 11, each drive wheel 7 is individually driven by the motor unit, and thus is greatly affected by a slippage. Therefore, the effect by the slip control with each slip control device according to the embodiment is more effectively exerted.

Alternative to an in-wheel motor type, each slip control device for an electric automobile can be provided to an electric automobile in which rotation is transmitted from motor units 3, which are mounted on a vehicle body, via drive shafts associated therewith to respective drive wheels 7.

REFERENCE NUMERALS

3 . . . motor unit
6 . . . driven wheel
7 . . . drive wheel
14 (14') . . . rotation frequency detection device
15 . . . rotation frequency detection device
21 . . . driven wheel rotation frequency observation module
22 . . . maximum rotation frequency calculation module
23 . . . drive wheel rotation frequency observation module
24 . . . slip condition determination module
26 . . . torque cancellation module

What is claimed is:

1. An inverter device, which includes a slip control device, provided in an electric automobile including at least one electric motor unit configured to rotationally drive a drive wheel, for slip controlling the electric automobile, the slip control device comprising:
a driven wheel rotation frequency observation module configured to observe a rotation frequency of a driven wheel;
a drive wheel rotation frequency observation module configured to observe a drive wheel rotation frequency N2 which is a rotation frequency of the drive wheel;
a torque cancellation module configured to make a torque command value to the motor unit that drives the drive wheel to be zero when a slip condition determination module determines that the drive wheel rotation frequency N2 exceeds a drive wheel maximum rotation frequency Nmax, the torque command value being based only on the observed rotation frequencies of the driven wheel and drive wheel,
wherein the drive wheel maximum rotation frequency Nmax is calculated by a maximum rotation frequency calculation module configured to calculate the current drive wheel maximum rotation frequency Nmax on the basis of the observed rotation frequency N1 of the driven wheel and a set ideal slip ratio $\lambda$ according to the formula $(Nmax-N1)/N1=\lambda$, and the slip condition determination module is configured to determine whether the observed drive wheel rotation frequency N2 exceeds the drive wheel maximum rotation frequency Nmax.

2. The inverter device for the electric automobile as claimed in claim 1, further comprising:
a slip watch condition determination module configured to determine whether the drive wheel rotation frequency N2 exceeds a watch condition rotation frequency Nc which is set to a value lower than the drive wheel maximum rotation frequency Nmax, if the slip condition determination module determines that the drive wheel rotation frequency N2 does not exceed the drive wheel maximum rotation frequency Nmax; and
a torque reduction module configured to decrease the torque command value to the motor unit that drives the drive wheel, if the slip watch condition determination module determines that the drive wheel rotation frequency N2 exceeds the watch condition rotation frequency Nc.

3. The inverter device as claimed in claim 2, wherein the torque reduction module calculates a difference between the drive wheel rotation frequency N2 and the drive wheel maximum rotation frequency Nmax, and decreases the torque command value as the difference decreases.

4. The inverter device for the electric automobile as claimed in claim 3, wherein, according to a nonlinear curve which defines a relationship between the difference and a ratio of the torque command value to the motor unit relative to a torque command value from an accelerator, the torque reduction module decreases the torque command value as the difference decreases.

5. An electric automobile comprising:
the inverter device as claimed in claim 1,
wherein the at least one electric motor unit includes a plurality of motor units,
the slip condition determination module and the torque cancellation module are provided for each of the motor units.

6. The electric automobile as claimed in claim 5, wherein the drive wheel includes a pair of left and right drive wheels,
the driven wheel includes a pair of left and right driven wheels, and
the driven wheel rotation frequency observation module uses an average of detection values of rotation frequencies of the pair of driven wheels, as the observed rotation frequency.

7. The electric automobile as claimed in claim 5, wherein the drive wheel includes a pair of left and right drive wheels,
the driven wheel includes a pair of left and right driven wheels, and
the driven wheel rotation frequency observation module uses a detection value of a rotation frequency of the driven wheel, of the pair of driven wheels, located at the same side as one drive wheel, of the pair of drive wheels, at which the slip condition determination module determines whether a slip condition has occurred, as the observed rotation frequency.

8. The electric automobile as claimed in claim 5, wherein each motor unit forms an in-wheel motor device.

* * * * *